No. 695,732. Patented Mar. 18, 1902.
K. M. KEISER.
APPARATUS FOR PRESERVING FRUITS OR VEGETABLES.
(Application filed Nov. 29, 1901.)
(No Model.)
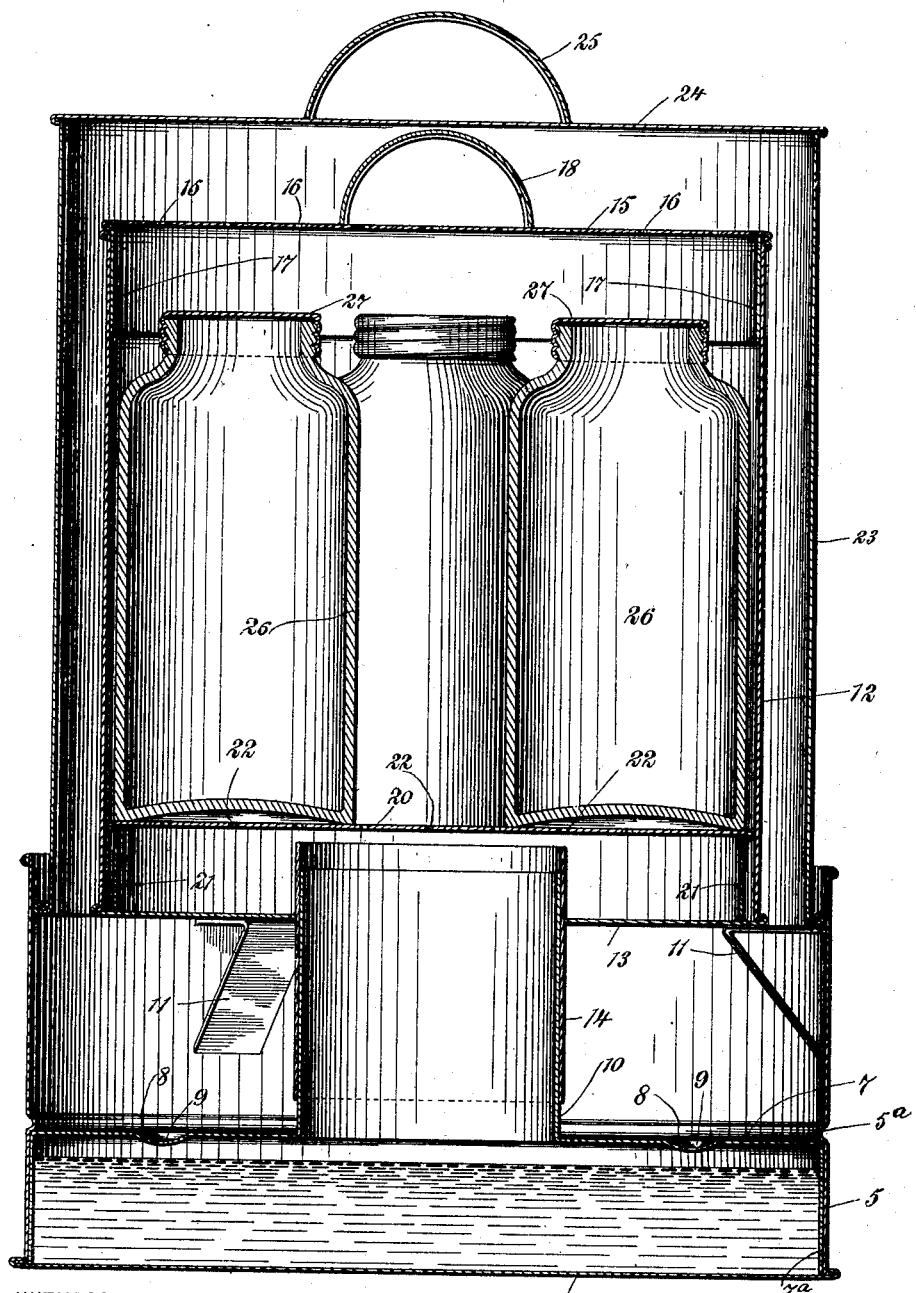
WITNESSES:
INVENTOR
Kathryn M. Keiser
BY
ATTORNEYS

UNITED STATES PATENT OFFICE.

KATHRYN M. KEISER, OF WALSHVILLE, ILLINOIS.

APPARATUS FOR PRESERVING FRUITS OR VEGETABLES.

SPECIFICATION forming part of Letters Patent No. 695,732, dated March 18, 1902.

Application filed November 29, 1901. Serial No. 84,024. (No model.)

*To all whom it may concern:*

Be it known that I, KATHRYN M. KEISER, a citizen of the United States, and a resident of Walshville, in the county of Montgomery and State of Illinois, have invented new and useful Improvements in Apparatus for Preserving Fruits or Vegetables, of which the following is a full, clear, and exact description.

My invention relates to an apparatus for preserving fruit and vegetables, although it may be employed as a means for cooking food.

In preserving fruit and vegetables it is important that the substances shall be cooked in their own juices in order to retain the natural flavor of the fruit or vegetable.

The improved apparatus provides for the reception in a compact manner of a number of closed vessels adapted to contain fruits or vegetables. These vessels are exposed to the heating action of steam, which is supplied from a steaming-tank in a manner to minimize the loss or waste of the steam. The escaping steam is retained in a jacket that condenses the steam and returns it or the water of condensation back to the tank. The several parts of the apparatus are constructed so that they are not liable to separate under the action of heat, thus reducing the cost of repairs. The apparatus in its entirety is quite simple in construction, can be manufactured at a low cost, is easy of manipulation and adjustment, and is claimed to be efficient in operation.

With these ends in view the invention consists in the construction, combination, and arrangement of parts, which will be hereinafter fully described and claimed.

Reference is to be had to the accompanying drawing, forming a part of this specification, in which the figure represents a vertical sectional elevation through an apparatus for preserving fruit and vegetables embodying my invention.

In carrying my invention into practice I employ a steaming-tank, (indicated by the numeral 5,) said tank having a bottom 6 and a horizontal partition 7. The shell of the tank 5 extends a suitable distance above the partition 7, the latter being arranged within the shell at a suitable distance below the open upper end thereof. This horizontal partition lies parallel to the bottom 6 of the tank, and said partition is formed with a series of depressions 8, that form pockets in the upper face of said partition. The depressions are formed with openings 9, which allow of the return back to the chamber of the tank of the water of condensation. The steaming-tank is furthermore provided with a central upstanding tube 10, which may be in a single piece of metal with the partition 7, or it may be made separately therefrom and secured firmly thereto by any approved means. The partition 7 may be united to the shell of the steaming-tank in any way known to the skilled constructor; but I prefer to provide the partition with a downwardly-extending flange 7$^a$, that fits within the shell of the tank, said partition being held in place by the inwardly-extending bead 5$^a$ of the shell forming a part of the steaming-tank. The tube 10 extends upwardly from the partition, so that its upper end will terminate flush with the top edge of the tank, or it may extend slightly above the same. The shell of the steaming-tank is furthermore provided with brackets 11, any suitable number of which may be secured to the inner face of the shell in a manner to extend inwardly therefrom, said brackets being arranged at suitable intervals from the upstanding tube 10.

12 designates the receptacle, adapted to be supported removably on the brackets 11 of the steaming-tank. The diameter of this receptacle is less than the internal diameter of the steaming-tank, and said receptacle is provided with a bottom 13 and an open upper end. Said bottom 13 of the receptacle is formed with a central opening, in which is secured a short length of pipe or tube 14, the latter extending upwardly a short distance from the bottom 13 of the receptacle; but it also extends a longer distance below said receptacle. The receptacle is fitted removably to the steaming-tank by having its bottom seated upon the brackets 11, while the tube 14 is arranged to fit over the upstanding tube 10 of the tank. The tube of the receptacle is thus coupled separately with the tube of the steaming-tank, and these two tubes provide a conduit or passage-way for the free escape of the steam from the tank 5 into the chamber of the receptacle 12. The receptacle is adapted to receive a cover 15, which is perforated, as indicated at 16, and is provided with a flange 17, that is adapted to fit into said receptacle. The cover 15 allows the steam to escape from the receptacle, and said cover is furthermore provided with a suitable handle 18.

20 designates a diaphragm, which is provided with a depending flange 21, said diaphragm being loosely arranged within the receptacle 12 and adapted to have its flange 21 rest upon the bottom 13 of said receptacle. The diaphragm is perforated throughout its area, as indicated at 22, and said diaphragm extends over the connected tubes 10 14 of the tank and from side to side of the receptacle. The diaphragm affords a means for supporting the vessels which contain the vegetable or fruit to be preserved in my apparatus, and said diaphragm may also support any suitable cooking vessel when it is desired to use the apparatus for cooking food.

23 designates a jacket or casing, which is in the form of a cylinder, open at its lower end and closed at its upper end by a head 24, said jacket being also provided with a suitable handle 25. The jacket or casing exceeds in diameter the receptacle 12, and the length of this jacket or casing is greater than the depth of the receptacle. The jacket is adapted to be placed in an inverted position over the receptacle, and it is intended to rest upon the brackets 11 outside of and around said receptacle.

The operation of the apparatus may be described as follows: The fruit or vegetables to be preserved are placed in suitable vessels (indicated by the numeral 26) and provided with caps or closures 27. The chamber of the steaming-tank 5 is filled with water, either up to the level indicated in the drawing or to a level above the partition 7, in order to submerge said partition and to prevent the steam from passing through the perforations 9. The steaming-tank is placed on a stove or any other suitable form of heater. The receptacle 12 is fitted into the upper part of the tank, so that its bottom will rest upon the brackets 11 and its tube 14 will be slipped over the tube 10, and then the diaphragm 20 is placed in said receptacle. The proper number of vessels 26 may now be placed within the receptacle 12, and the cover 15 is fitted to said receptacle so as to close its open upper end. Finally the jacket or casing 23 is placed over the receptacle and rests upon the brackets 11, said brackets serving to protect the casing from the cooling effect of the external surrounding atmosphere. The heat of the stove converts the water of the tank into steam, which is free to rise through the coupled tubes 10 14 and pass into the chamber of the receptacle 12. The steam circulates around the vessels 26, so as to thoroughly heat the same and cook the contents thereof in their own juices, after which the steam escapes through the perforated cover 15 and is collected by and within the jacket or casing 23, the latter serving to partly condense the steam and return the water of condensation back to the shell of the steaming-tank.

Having thus described my invention, I claim as new and desire to secure by Letters Patent—

1. A preserving apparatus comprising a steaming-tank having a horizontal partition, an upstanding tube attached to the partition and communicating with the chamber of the tank, a receptacle fitted in and supported by the tank and provided on its bottom with a tube which is fitted to said upstanding tube, and a perforated vessel-supporting diaphragm fitting in the receptacle and having a depending flange resting on the bottom of said receptacle, said diaphragm lying across the connected tubes of the tank and the receptacle.

2. A preserving apparatus comprising a steaming-tank provided with a perforated horizontal partition, an upstanding tube attached to the partition and communicating with the chamber of said tank, a receptacle supported by said tank and having its bottom fitted to the upstanding tube, a perforated vessel-supporting diaphragm having a depending flange and fitted in said receptacle, said flange of the diaphragm resting on the bottom of the receptacle, said diaphragm snugly filling the receptacle and extending across the tube, and an external jacket surrounding the receptacle and supported within the steaming-tank.

3. A preserving apparatus comprising a steaming-tank provided with a perforated horizontal partition, a tube extending upwardly from the tank and communicating with the chamber thereof, brackets in the tank around said tube and above the partition, a receptacle mounted on said brackets for support thereby in the tank and communicating with the tube, a jacket surrounding the receptacle and also resting on the brackets for support within the tank, and a flanged perforated diaphragm snugly filling the lower part of the receptacle and supported therein across the tube, said diaphragm adapted to support one or more vessels in the receptacle.

In testimony whereof I have signed my name to this specification in the presence of two subscribing witnesses.

KATHRYN M. KEISER.

Witnesses:
 MARY HOLLAND,
 PAULINE KEISER.